United States Patent Office 3,493,601
Patented Feb. 3, 1970

3,493,601
4-CYCLOHEXYL-CYCLOHEXYLIDENEACETIC ACIDS AND ESTERS THEREOF
Philip E. Shaw, Winter Haven, Fla., and Sol J. Daum, Albany, and Robert L. Clarke, Bethlehem, N.Y., assignors to Sterling Drug Inc., New York, N.Y., a corporation of Delaware
No Drawing. Filed Oct. 11, 1966, Ser. No. 585,770
Int. Cl. C07c *69/66, 69/74*
U.S. Cl. 260—468                         11 Claims

ABSTRACT OF THE DISCLOSURE 4-cyclohexyl-cyclohexanone or a derivative thereof wherein the 4-cyclohexyl group is substituted in the 4-position by oxo, hydroxy or acyloxy reacts with a tri-lower-alkyl α-phosphono-lower-alkanoate to give a lower-alkyl 4-cyclohexyl-$\Delta^{1,\alpha}$-cyclohexaneacetate or corresponding derivative thereof. The latter is hydrolyzed to the free acid, which, via the acid chloride, is esterified with an amino-lower-alkanol, giving basic esters possessing cardiotonic activity.

---

This invention relates to bicyclic substituted acids and esters thereof, and in particular is concerned with 4-cyclohexyl-cyclohexylideneacetic acids and basic esters thereof, and with intermediates in the preparation thereof.

The compounds of the invention are of the formula:

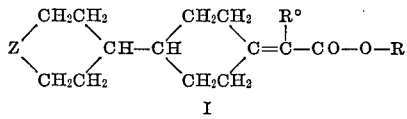

I wherein R is hydrogen, lower-alkyl or amino-lower-alkyl; R° is hydrogen or lower-alkyl; and Z is CH₂, O=C, (HO)CH, (acylO)CH, (lower-alkylO)CH, or $$R-O-CO-C(R°)=C.$$

The term "lower-alkyl" used above in defining the groups R and R° and certain subgroups under Z stands for alkyl groups having up to about six carbon atoms, including such groups as methyl, ethyl, propyl, isopropyl, butyl, hexyl, and the like.

When R in Formula I stands for an amino-lower-alkyl group, it represents a lower-alkyl group substituted by a basic amino group. The exact nature of the basic amino moiety is not critical, although it is preferred that it have a molecular weight less than about 200. A particularly preferred type of amino-lower-alkyl group has the structure —Y—N=B wherein Y is lower-alkylene of 2–5 carbon atoms and N=B is unsubstituted amino, lower-alkylamino, di-lower-alkylamino, polymethylenimino of 5–7 ring carbons and lower-alkylated derivatives thereof, 4-morpholinyl and lower-alkylated derivatives thereof, or 1-piperazinyl and lower-alkylated derivatives thereof. The term "lower-alkyl" as used in defining portions of the amino moiety N=B stands for alkyl groups having up to about six carbon atoms.

When Z in Formula I above stands for (acylO)CH, the acyl groups are carboxylic acyl groups having from one to twelve carbon atoms and molecular weights less than about 250. Representative of the lower-carboxylic acyl radicals which can be present are lower-alkyanoyl, e.g., acetyl, propionyl, isobutyryl, caproyl, heptanoyl, octanoyl, dodecanoyl, trimethylacetyl, and the like; cycloalkyl-lower-alkanoyl wherein cycloalkyl has 5–6 ring members, e.g., β-cyclopentylpropionyl, β-cyclohexylpropionyl, and the like; benzoyl; phenyl-lower-alkanoyl or -alkenoyl, e.g., phenylacetyl, β-phenylpropionyl, cinnamoyl, and the like; phenoxy-lower-alkanoyl, e.g., p-chlorophenoxyacetyl; carbamyl, including unsubstituted carbamyl, N-lower-alkylcarbamyl, N-phenylcarbamyl and N,N-di-lower-alkylcarbamyl; and pyridylcarbonyl, e.g., nicotinoyl and isonicotinoyl. In acyl radicals containing a phenyl group, the benzene ring thereof can be unsubstituted or substituted by any number and kind of substituents inert under the reaction conditions used, including lower-alkyl, for example p-tolyl; lower-alkoxy, for example 3,4-dimethoxyphenyl; halogen (including fluorine, chlorine, bromine and iodine), for example 2-bromophenyl; and nitro, for example p-nitrophenyl. The lower-alkyl and lower-alkoxy groups preferably have from one to four carbon atoms.

The compounds of Formula I wherein R is lower-alkyl can be prepared by reacting a compound of the formula

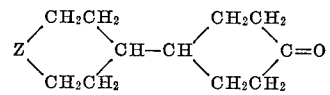

II wherein Z has the same meaning given hereinabove with a tri-lower-alkyl α-phosphono-lower-alkanoate of the formula

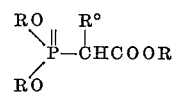

wherein R is lower-alkyl and R° is hydrogen or lower-alkyl, in the presence of a basic compound capable of acting as a proton acceptor. Examples of such basic compounds are alkali metal alkoxides, amides or hydrides, e.g., sodium methoxide, sodium amide and sodium hydride, and the reaction is preferably carried out in non-aqueous medium at ordinary temperatures.

In the event that the starting material is bicyclohexyl-4,4'-dione (II; Z is O=C), the reaction with a tri-lower-alkyl α-phosphono-lower-alkanoate produces a mixture of di-lower-alkyl bicyclohexyl-$\Delta^{4,\alpha;4',\alpha'}$-di-lower-alkanoate [I; R is lower-alkyl, Z is R—O—CO—C(R°)=C and lower-alkyl 4-(4-oxocyclohexyl)-$\Delta^{1,\alpha}$-cyclohexane-lower-alkanoate [I; R is lower-alkyl, Z is C=O]. In the former product, both carbonyl groups of the bicyclohexyl-4,4'-dione have taken part in the reaction, and in the latter product only one of the carbonyl groups has taken part. The product mixture can readily be separated into the two components which can then be carried on separately in subsequent transformations.

The compounds of Formula I wherein R is hydrogen are prepared by alkaline hydrolysis of the compounds of Formula I wherein R is lower-alkyl.

The compounds of Formula I wherein R is amino-lower-alkyl are prepared by esterification of the compounds of Formula I wherein R is hydrogen by employing the appropriate amino-lower-alkanol or amino-lower-alkyl halide. A preferred method comprises reacting the acid halide (e.g., chloride or bromide) of a free acid of Formula I with an amino-lower-alkanol, although an alternative procedure involves reacting an alkali metal salt (e.g., sodium salt) of the acid with an amino-lower-alkyl halide (e.g., chloride or bromide). Surprisingly, the acid halide process can be used even in the presence of a free hydroxy group [Z=(HO)CH]. It appears that if reaction does occur at the hydroxy group during acid halide formation, the hydroxy group is regenerated during the preparation of the basic ester.

The structures of the compounds of the invention were established by the modes of synthesis, by elementary analysis, by interpretation of their infrared, ultraviolet and NMR spectra, and by their behavior in thin layer chromatography (TLC) and gas-liquid phase chromatography (GLPC).

The compounds of Formula I wherein R is amino-lower-alkyl are basic in nature and form acid-addition salts with moderate to strong inorganic or organic acids. Said acid-addition salt forms are within the purview of the invention and are considered the full equivalents of the corresponding free bases. For pharmacological purposes it is preferred to use water-soluble, pharmaceutically acceptable acid-addition salts, although all acid-addition salts are useful as characterizing derivatives of and as intermediates in the purification of the free bases.

Pharmacological evaluation of the basic ester compounds of the invention has shown that they possess cardiotonic activity similar to that shown by the natural product cassaine and are thus useful in increasing the ventricular contractile force of the mammalian heart. The $ED_{20}$ values (intravenous dose in mg./kg. necessary to produce a 20% increase in ventricular contractile force) are approximately 1.3–1.5. The compounds are prepared for use in the form of a sterile aqueous solution of a water-soluble, pharmaceutically acceptable acid-addition salt.

The following examples will further illustrate the invention without the latter being limited thereby.

EXAMPLE 1

Ethyl 4-(4-oxocyclohexyl)-$\Delta^{1,\alpha}$-cyclohexaneacetate
[I; R is $C_2H_5$, R° is H, Z is O=C]

To a solution of sodium ethoxide, prepared from 8.6 g. (0.37 mole) of sodium, in 850 ml. of dry dimethylformamide at 10–20° C. was added with stirring 83.3 g. (0.37 mole) of triethyl phosphonoacetate over a 20 minute period, and stirring was continued for 30 minutes more. This solution was then added drop-wise with vigorous stirring to a solution of 67.1 g. (0.346 mole) of bicyclohexyl-4,4'-dione in 325 ml. of dry dimethylformamide at 15–20° C over a 90 minute period. The resulting solution was allowed to stand at room temperature for two hours and was then poured into 5 liters of saturated sodium chloride solution. This mixture was extracted three times with ether and the extracts were dried over sodium sulfate and concentrated to give 107.5 g. of an oily residue. The oily product was chromatographed on 1.5 kg. of silica gel. Elution with ether-pentane (1:9) removed 8 g. of diethyl bicyclohexyl-$\Delta^{4,\alpha;4',\alpha'}$-diacetate [I; R is $C_2H_5$, R° is H, Z is $C_2H_5O-CO-CH=C$], M.P. 62–71° C. after two recrystallizations from ether.

Elution of the chromatographic column with ether-pentane (1:4) removed 34.6 g. of material, which, after a single recrystallization from hexane, afforded 32.4 g. of ethyl 4 - (4-oxocyclohexyl)-$\Delta^{1,\alpha}$-cyclohexaneacetate, M.P. 56–58° C.

By replacing the triethyl phosphonoacetate in the foregoing preparation by a molar equivalent amount of triethyl α-phosphonopropionate or trimethyl α-phosphonovalerate, there can be obtained, respectively, diethyl bicyclohexyl-$\Delta^{4,\alpha;4',\alpha'}$-dipropionate [I; R is $C_2H_5$, R° is $CH_3$, Z is $C_2H_5O-CO-C(CH_3)=C$] and ethyl 4-(4-oxocyclohexyl)-$\Delta^{1,\alpha}$-cyclohexanepropionate [I; R is $C_2H_5$, R° is $CH_3$, Z is O=C]; or dimethyl bicyclohexyl-$\Delta^{4,\alpha;4',\alpha'}$-divalerate [I; R is $CH_3$, R° is $C_3H_7$, Z is $$CH_3-O-CO-C(C_3H_7)=C]$$

and methyl 4-(4-oxocyclohexyl)-$\Delta^{1,\alpha}$-cyclohexanevalerate [I; R is $CH_3$, R° is $C_3H_7$, Z is O=C].

By replacing the bicyclohexyl-4,4'-dione in the foregoing preparation by a molar equivalent amount of 4-(4-hydroxycyclohexyl)cyclohexanone, 4 - cyclohexylcyclohexanone, 4-(4-acetoxycyclohexyl)cyclohexanone, or 4-(4 - methoxycyclohexyl)cyclohexanone, there can be obtained, respectively, ethyl 4-(4-hydroxycyclohexyl)-$\Delta^{1,\alpha}$-cyclohexaneacetate [I; R is $C_2H_5$, R° is H, Z is (HO)CH], ethyl 4 - cyclohexyl - $\Delta^{1,\alpha}$-cyclohexaneacetate [I; R is $C_2H_5$, R° is H, Z is $CH_2$], ethyl 4-(4-acetoxycyclohexyl)-$\Delta^{1,\alpha}$-cyclohexaneacetate [I; R is $C_2H_5$, R° is H, Z is $(CH_3COO)CH$], or ethyl 4-(4-methoxycyclohexyl)-$\Delta^{1,\alpha}$-cyclohexaneacetate [I; R is $C_2H_5$, R° is H, Z is $(CH_3O)CH$].

EXAMPLE 2

Ethyl 4-(4-hydroxycyclohexyl)-$\Delta^{1,\alpha}$-cyclohexaneacetate
[I; R is $C_2H_5$, R° is H, Z is (HO)CH]

A solution of 2.00 g. (0.0076 mole) of ethyl 4-(4-oxocyclohexyl)-$\Delta^{1,\alpha}$-cyclohexaneacetate (Example 1) in 25 ml. of dry tetrahydrofuran was added dropwise with stirring to a solution of 3.00 g. (0.012 mole) of lithium aluminum tri-tertiary-butoxy-hydride in 35 ml. of dry tetrahydrofuran at 5–10° C. The resulting solution was stirred for 30 minutes, treated with 2 ml. of acetic acid and concentrated to a residue by warming under reduced pressure. The residue was dissolved in water and ether, the layers were separated and the ether layer was washed with dilute hydrochloric acid. Concentration of this ether solution afforded 1.93 g. of crystalline solid. Recrystallization of the solid twice from acetonitrile afforded 1.00 g. (50%) of ethyl 4 - (4 - hydroxycyclohexyl)-$\Delta^{1,\alpha}$-cyclohexaneacetate, M.P. 102–103° C.

EXAMPLE 3

Ethyl 4-(4-t-butoxycyclohexyl)-$\Delta^{1,\alpha}$cyclohexaneacetate
[I; R is $C_2H_5$, R° is H, Z is [$(CH_3)_3CO$]CH]

A mixture of 6.00 g. (0.0225 mole) of ethyl 4-(4-hydroxycyclohexyl) - $\Delta^{1,\alpha}$-cyclohexaneacetate (Example 2), 150 ml. of methylene iodide, 1.50 ml. of boron trifluoride etherate, 0.66 ml. of 100% phosphoric acid and 100 ml. of isobutene was shaken vigorously in a closed vessel at room temperature for four hours. To this mixture were added 75 ml. of 2 N ammonium hydroxide, 7 ml. of brine and 100 ml. of ether. The layers were separated and the organic layer was washed twice with brine and concentrated to a residue. The residue was chromatographed on 150 g. of silica gel using 1:9 ether-pentane for elution to give 5.04 g. of crude product. Elution with pure ether afforded 1.38 g. (23%) of recovered starting material, M.P. 98–100° C. Recrystallization of the product from methanol gave 4.92 g. (68%) of ethyl 4-(4-t-butoxycyclohexyl) - $\Delta^{1,\alpha}$-cyclohexaneacetate, M.P. 72–77° C. One further recrystallization raised the M.P. to 77–79° C.

EXAMPLE 4

Ethyl 4 - (4-hydroxycyclohexyl)-$\Delta^{1,\alpha}$-cyclohexaneacetate N - phenylcarbamate [I; R is $C_2H_5$, R° is H, Z is $(C_6H_5NHCOO)CH$]

A mixture of 6.0 g. (0.022 mole) of ethyl 4-(4-hydroxycyclohexyl)-$\Delta^{1,\alpha}$-cyclohexaneacetate (Example 2), 2.58 g. (0.022 mole) of phenylisocyanate and 30 ml. of acetonitrile was heated under reflux for seven hours. When the cooled mixture formed a pasty mass, it was diluted with enough water to render it a mobile slurry for filtration. The collected solid was recrystallized once from 60 ml. of acetonitrile to give 5.68 g. of ethyl 4-(4-hydroxycyclohexyl)-$\Delta^{1,\alpha}$-cyclohexaneacetate N-phenylcarbamate, M.P. 132–134° C.

EXAMPLE 5

4-(4-oxocyclohexyl)-$\Delta^{1,\alpha}$-cyclohexaneacetic acid
[I; R and R° are H, Z is O=C]

A solution of 51.4 g. (0.195 mole) of ethyl 4-(4-oxocyclohexyl)-$\Delta^{1,\alpha}$-cyclohexaneacetate in 850 ml. of absolute ethanol was treated with 145 ml. of 2 N aqueous sodium hydroxide and allowed to stand overnight. The alcohol was removed by warming the mixture under reduced pressure and the aqueous solution was washed with ether. The aqueous solution was solidified with 2 N hydrochloric acid and the precipitated acid was extracted with ether. The ether extracts were washed with sodium chloride solution, dried over anhydrous sodium sulfate and concentrated in vacuo. There was thus afforded 36 g. of acid which was recrystallized twice from acetonitrile to give 25.9 g. (56%) of 4-(4-oxocyclohexyl)-$\Delta^{1,\alpha}$-cyclohexaneacetic acid, M.P. 161.5–164.5° C., unchanged upon further recrystallization.

EXAMPLE 6

4-(4-hydroxycyclohexyl)-$\Delta^{1,\alpha}$-cyclohexaneacetic acid [I; R and R° are H, Z is (HO)CH] was prepared by hydrolysis of ethyl 4-(4-hydroxycyclohexyl)-$\Delta^{1,\alpha}$-cyclohexaneacetate (Example 2) according to the procedure of Example 5. The product was recrystallized from ethyl acetate to give 4-(4-hydroxycyclohexyl)-$\Delta^{1,\alpha}$-cyclohexaneacetic acid, M.P. 185–187.5° C. (evacuated tube).

EXAMPLE 7

4-(4-t-butoxycyclohexyl)-$\Delta^{1,\alpha}$-cyclohexaneacetic acid [I; R and R° are H, Z is [(CH$_3$)$_3$CO]CH] was prepared by hydrolysis of ethyl 4-(4-t-butoxycyclohexyl)-$\Delta^{1,\alpha}$-cyclohexaneacetate (Example 3) by the procedure of Example 5. The produce was recrystallized from acetonitrile to give 4-(4-t-butoxycyclohexyl)-$\Delta^{1,\alpha}$-cyclohexaneacetic acid, M.P. 188–190° C.

EXAMPLE 8

4-(4-hydroxycyclohexyl)-$\Delta^{1,\alpha}$-cyclohexaneacetic acid N-phenylcarbamate [I; R and R° are H, Z is (C$_6$H$_5$NHCOO)CH] was prepared by hydrolysis of ethyl 4 - (4 - hydroxycyclohexyl) - $\Delta^{1,\alpha}$ - cyclohexaneacetate N-phenylcarbamate by the procedure of Example 5. The product was recrystallized from acetonitrile to give 4-(4-hydroxycyclohexyl)-$\Delta^{1,\alpha}$-cyclohexaneacetic acid N-phenylcarbamate, M.P. 203–207° C.

By the same hydrolysis procedure the following acids can be prepared from the corresponding lower-alkyl esters:

Bicyclohexyl-$\Delta^{4,\alpha;4',\alpha'}$-diacetic acid [I; R and R° are H, Z is HO—CO—CH=C];
Bicyclohexyl-$\Delta^{4,\alpha;4',\alpha'}$-dipropionic acid [I; R is H, R° is CH$_3$, Z is HO—CO—C(CH$_3$)=C];
4-(4-oxocyclohexyl)-$\Delta^{1,\alpha}$-cyclohexanepropionic acid [I; R is H, R° is CH$_3$, Z is O=C];
Bicyclohexyl-$\Delta^{4,\alpha;4',\alpha'}$-divaleric acid [I; R is H, R° is C$_3$H$_7$, Z is HO—CO—C(C$_3$H$_7$)=C];
4-(4-oxocyclohexyl)-$\Delta^{1,\alpha}$-cyclohexanevaleric acid [I; R is H, R° is C$_3$H$_7$, Z is O=C];
4-cyclohexyl-$\Delta^{1,\alpha}$-cyclohexaneacetic acid [I; R and R° are H, Z is CH$_2$];
4-(4-methoxycyclohexyl)-$\Delta^{1,\alpha}$-cyclohexaneacetic acid [I; R and R°, are H, Z is (CH$_3$O)CH].

EXAMPLE 9

2-dimethylaminoethyl 4-(4-oxocyclohexyl)-$\Delta^{1,\alpha}$-cyclohexaneacetate [I; R is CH$_2$CH$_2$N(CH$_3$)$_2$, R° is H, Z is O=C]

To a solution of 17.4 g. of 4-(4-oxocyclohexyl)-$\Delta^{1,\alpha}$-cyclohexaneacetic acid (Example 5) in 260 ml. of methanol was added 73.5 ml. of 1 N sodium hydroxide solution. The mixture was concentrated to dryness in vacuo, 50 ml. of absolute ethanol and 50 ml. of dry benzene were added to the residue, and the mixture was concentrated to dryness in vacuo. Dry benzene (50 ml.) was added to the residue, the mixture concentrated to dryness and the procedure repeated to insure anhydrous conditions. To the residue was added 150 ml. of dry benzene, followed by dropwise addition of 18.79 g. of oxalyl chloride in 15 ml. of dry benzene while keeping the temperature below 35° C. The mixture was stirred for fifteen minutes and then concentrated to dryness in vacuo at below 45° C. To the residue was added 150 ml. of dry benzene, followed by dropwise addition of a solution of 26.34 g. of 2-dimethylaminoethanol in 15 ml. of benzene with stirring, and the reaction mixture was warmed for ten minutes at 55° C. To the reaction mixture was added 200 ml. of 2 N ammonium hydroxide solution and 60 g. of sodium chloride, and the mixture was extracted with ether. The ether extracts were filtered and washed with 1 N hydrochloric acid solution. The hydrochloric acid extracts were made strongly basic with concentrated ammonium hydroxide and extracted with ether. The ether extracts were washed with saturated sodium chloride solution, dried over anhydrous sodium sulfate and concentrated in vacuo to give 14.6 g. of residual oil. The latter was purified by chromatography on 600 g. of silica gel using a 0.5:0.5:70:29 mixture of methanol, isopropylamine, ether and pentane for elution. This afforded 6.91 g. of 2-dimethylaminoethyl 4-(4-oxocyclohexyl)-$\Delta^{1,\alpha}$-cyclohexaneacetate.

By replacing the 2-dimethylaminoethanol in the foregoing preparation by a molar equivalent amount of 3-dibutylaminopropanol, 2-(1-piperidyl)ethanol, 2-(1-pyrrolidyl)ethanol, 2-(4-morpholinyl)ethanol, 2-(4-methyl - 1-piperidyl)ethanol, or 2-(4-methyl-1-piperazinyl)ethanol, there can be obtained respectively, 3-dibutylaminopropyl 4-(4-oxocyclohexyl) - $\Delta^{1,\alpha}$ - cyclohexaneacetate [I; R is CH$_2$CH$_2$CH$_2$N(C$_4$H$_9$)$_2$, R° is H, Z is O=C], 2-(1-piperidyl)ethyl 4-(4-oxocyclohexyl) - $\Delta^{1,\alpha}$ - cyclohexaneacetate [I; R is CH$_2$CH$_2$N(CH$_2$)$_5$, R° is H, Z is O=]; 2-(1pyrrolidyl)ethyl 4-(4 - oxocyclohexyl) - $\Delta^{1,\alpha}$ - cyclohexaneacetate [I; R is CH$_2$CH$_2$N(CH$_2$)$_4$, R° is H, Z is O=C], 2-(4 - morpholinyl)ethyl 4 - (4 - oxocyclohexyl)-$\Delta^{1,\alpha}$-cyclohexaneacetate [I; R is CH$_2$CH$_2$N(CH$_2$)$_4$O, R° is H, Z is O=C], 2-(4-methyl-1-piperidyl)ethyl 4-(4-oxocyclohexyl)-$\Delta^{1,\alpha}$-cyclohexaneacetate [I; R is

$$CH_2CH_2N(CH_2)_4CHCH_3$$

R° is H, Z is O=C], or 2-(4-methyl-1-piperazinyl)ethyl 4-(4-oxocyclohexyl) - $\Delta^{1,\alpha}$ - cyclohexaneacetate [I; R is CH$_2$CH$_2$N(CH$_2$)$_4$NCH$_3$, R° is H, Z is O=C].

EXAMPLE 10

2-dimethylaminoethyl 4-(4 - hydroxycyclohexyl) - $\Delta^{1,\alpha}$-cyclohexaneacetate [I; R is CH$_2$CH$_2$N(CH$_3$)$_2$, R° is H, Z is (HO)CH] was prepared from 6 g. of 4-(4-hydroxycyclohexyl)-$\Delta^{1,\alpha}$-cyclohexaneacetic acid (Example 6) according to the procedure described above in Example 9. The product was purified by partition chromatography and recrystallized from acetonitrile to give 2-dimethylaminoethyl 4-(4-hydroxycyclohexyl) - $\Delta^{1,\alpha}$ - cyclohexaneacetate, M.P. 97–98.5° C.; hydrochloride salt form, M.P. 234–235° C. (colorless needles from isopropyl alcohol); dihydrogen phosphate salt form, M.P. 178–188° C. (colorless plates from absolute ethanol).

EXAMPLE 11

2-dimethylaminoethyl 4-(4-t-butoxycyclohexyl) - $\Delta^{1,\alpha}$-cyclohexaneacetate [I; R is CH$_2$CH$_2$N(CH$_3$)$_2$, R° is H, Z is [(CH$_3$)$_3$CO]CH] was prepared from 1.84 g. of 4-(4-t-butoxycyclohexyl)-$\Delta^{1,\alpha}$-cyclohexaneacetic acid (Example 7) according to the procedure described above in Example 9. The product was purified by partition chromatography on infusorial earth to give 2-dimethylaminoethyl 4-(4-t-butoxycyclohexyl)-$\Delta^{1,\alpha}$ - cyclohexaneacetate, obtained in the form of its hydrochloride salt, M.P. 231° C. (dec.) when recrystallized from methanol-ether in the cold. Warming of this salt in methanol caused cleavage of the butyl ether.

EXAMPLE 12

2-dimethylaminoethyl 4-(4-hydroxycyclohexyl)-$\Delta^{1,\alpha}$ - cyclohexaneacetate N-phenylcarbamate [I; R is

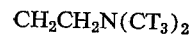
$$CH_2CH_2N(CT_3)_2$$

R° is H, Z is (C$_6$H$_5$NHCOO)CH]

A suspension of 7.60 g. (0.021 mole) of 4-(4-hydroxycyclohexyl)-$\Delta^{1,\alpha}$-cyclohexaneacetic acid N-phenylcarbamate (Example 8) in 80 ml. of chloroform was treated with 30 ml. of thionyl chloride dropwise with stirring and cooling. The mixture was stirred at room temperature until it became homogeneous (three hours) and for one-half hour longer. The solution was concentrated to a residue at below 35° C. under reduced pressure and 80 ml. of chloroform was added. 2-dimethylaminoethanol (19 ml.) was added dropwise with stirring and cooling, and the mixture was boiled for five minutes. It was cooled and diluted with ether and dilute ammonium hydroxide. The ether layer was washed twice with brine and concentrated to a residue which crystallized. The product was chromatographed on eight 20-cm. by 40-cm. silica coated plates which were developed with 3:3:94 methanol-isopropylamine-chloroform. The material from the main band was recrystallized from acetonitrile to give 1.79 g. (20%) of 2-dimethylaminoethyl 4-(4-hydroxycyclohexyl)-$\Delta^{1,\alpha}$ - cyclohexaneacetate N - phenylcarbamate, M.P. 107–108° C.

According to the foregoing esterification procedures the following compounds can be prepared from the corresponding free acids:

Bis(2-dimethylaminoethyl) bicyclohexyl-$\Delta^{4,\alpha;4',\alpha'}$ - diacetate [I; R is $CH_2CH_2N(CH_3)_2$, R° is H, Z is

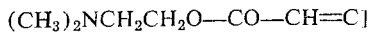

Bis(2-dimethylaminoethyl) bicyclohexyl-$\Delta^{4,\alpha;4',\alpha'}$ - dipropionate [I; R is $CHCH_2N(CH_3)_2$, R° is $CH_3$, Z is $(CH_3)_2NCH_2CH_2O-CO-C(CH_3)=C$];

2 - dimethylamino 4 - (4 - oxocyclohexyl - $\Delta^{1,\alpha}$ - cyclohexanepropionate [I; R is $CH_2CH_2N(CH_3)_2$, R° is $CH_3$, Z is O=C];

Bis(2-dimethylaminoethyl) bicyclohexyl-$\Delta^{4,\alpha;4',\alpha'}$ - divalerate [I; R is $CH_2CH_2N(CH_3)_2$, R° is $CH_3H_7$, Z is $(CH_3)_2NCH_2CH_2O-CO-C(C_3H_7)=C$];

2-dimethylaminoethyl 4-(4-oxocyclohexyl) - $\Delta^{1,\alpha}$ - cyclohexanevalerate [I; R is $CH_2CH_2N(CH_3)_2$, R° is $C_3H_7$, Z is O=C];

2-dimethylaminoethyl 4-(4-methoxycyclohexyl)-$\Delta^{1,\alpha}$-cyclohexaneacetate [I; R is $CH_2CH_2N(CH_3)_2$, R° is H, Z is $(CH_3O)CH$];

2-dimethylaminoethyl 4-cyclohexyl - $\Delta^{1,\alpha}$ - cyclohexaneacetate [I; R is $CH_2CH_2N(CH_3)_2$, R° is H, Z is $CH_2$].

2-dimethylaminoethyl 4-(4-hydroxycyclohexyl) - $\Delta^{1,\alpha}$-cyclohexaneacetate (Example 10) can be caused to react with acetic anhydride, caproyl chloride, benzoyl chloride, p-methoxybenzoyl chloride, β-cyclopentylpropionyl chloride, cinnamoyl chloride or nicotinoyl chloride in pyridine solution, to give, respectively, the acetate, caproate, benzoate, p-methoxybenzoate, β-cyclopentyl propionate, cinnamate or nicotinate of 2-dimethylaminoethyl 4 - (4-hydroxycyclohexyl)-$\Delta^{1,\alpha}$-cyclohexaneacetate.

4-(4-oxocyclohexyl)-$\Delta^{1,\alpha}$-cyclohexaneacetic acid can be converted to its sodium salt with one equivalent of sodium methoxide in dimethylsulfoxide solution, and said sodium salt then caused to react with benzyl 2-bromoethylcarbamate or benzyl (N-methyl)-2 - bromoethylcarbamate to give, respectively, 2-(carbobenzoxyamino) - ethyl 4 - (4-oxocyclohexyl)$^{1,\alpha}$-cyclohexaneacetate or 2 - [carbobenzoxy - (N - methyl)amino] - ethyl 4 - (4 - oxocyclohexyl)-$\Delta^{1,\alpha}$-cyclohexaneacetate. The latter two compounds, when treated with trifluoroacetic acid, one day at room temperature, can be converted, respectively, to 2-aminoethyl 4-(4-oxocyclohexyl) - $\Delta^{1,\alpha}$ - cyclohexaneacetate [I; R is $CH_2CH_2NH_2$, R° is H, Z is O=C], or 2-methylaminoethyl 4-(4-oxocyclohexyl) - $\Delta^{1,\alpha}$ - cyclohexaneacetate [I; R is $CH_2CH_2NHCH_3$, R° is H, Z is O=C].

We claim:
1. A compound of the formula

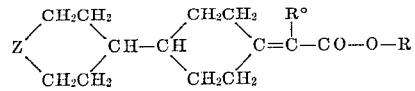

wherein R is hydrogen, lower-alkyl or amino-lower-alkyl; R° is hydrogen or lower-alkyl; and Z is $CH_2$, O=C, (HO)CH, (acylO)CH, (lower-alkylO)CH, or R—O—CO—C(R°)=C.

2. A compound according to claim 1 wherein R is lower-alkyl.

3. Lower-alkyl 4 - (4-oxocyclohexyl)-$\Delta^{1,\alpha}$-cyclohexaneacetate, according to claim 2, wherein R° is hydrogen and Z is O=C.

4. A compound according to claim 1 wherein R is hydrogen.

5. 4-(4-oxocyclohexyl)-$\Delta^{1,\alpha}$-cyclohexaneacetic acid, according to claim 4, wherein R° is hydrogen and Z is O=C.

6. A compound according to claim 1 wherein R is amino-lower-alkyl.

7. 2-dimethylaminoethyl 4 - (4-oxocyclohexyl)-$\Delta^{1,\alpha}$-cyclohexaneacetate, according to claim 6, wherein R is 2-dimethylaminoethyl, R° is hydrogen, and Z is O=C.

8. 2-dimethylaminoethyl 4-(4-hydroxycyclohexyl)-$\Delta^{1,\alpha}$-cyclohexaneacetate, according to claim 6, wherein R is 2-dimethylaminoethyl, R° is hydrogen, and Z is (HO)CH.

9. 2 - dimethylaminoethyl 4-(4-tert.-butoxycyclohexyl)-$\Delta^{1,\alpha}$-cyclohexaneacetate, according to claim 6, wherein R is 2-dimethylaminoethyl, R° is hydrogen, and Z is $(CH_3)_3COCH$.

10. 2 - dimethylaminoethyl 4 - [4-(N-phenylcarbamoyloxy)-cyclohexyl]-$\Delta^{1,\alpha}$-cyclohexaneacetate, according to claim 6, wherein R is 2-dimethylaminoethyl, R° is hydrogen, and Z is $(C_6H_5NHCOO)CH$.

11. Di-lower-alkyl bicyclohexyl-$\Delta^{4,\alpha;4',\alpha'}$-diacetate, according to claim 1, wherein R is lower-alkyl, R° is hydrogen, and Z is lower-alkyl—O—COCH=C.

References Cited

FOREIGN PATENTS 6505232  10/1965  Netherlands.

LORRAINE A. WEINBERGER, Primary Examiner

PAUL J. KILLOS, Assistant Examiner

U.S. Cl. X.R.

260—239, 247.2, 268, 294.3, 295, 326.3, 410, 514, 999